United States Patent [19]

McCullough

[11] Patent Number: 4,571,575
[45] Date of Patent: Feb. 18, 1986

[54] SYNCHRONIZATION-PROMOTING DATA CODING METHOD

[75] Inventor: Robert B. McCullough, Sunol, Calif.

[73] Assignee: Sunol Systems Incorporated, Pleasanton, Calif.

[21] Appl. No.: 606,876

[22] Filed: May 3, 1984

[51] Int. Cl.⁴ .......................................... H03K 13/24
[52] U.S. Cl. ............................ 340/347 DD; 360/39; 360/40
[58] Field of Search ............ 340/347 DD; 360/40-48

[56] References Cited

U.S. PATENT DOCUMENTS

| | | | |
|---|---|---|---|
| 4,115,768 | 9/1978 | Eggenberger | 340/347 DD |
| 4,146,909 | 3/1979 | Beckenhauer | 360/39 |
| 4,451,819 | 5/1984 | Beckenhauer | 340/347 DD |
| 4,484,176 | 11/1984 | Fitzpatrick | 340/347 DD |

Primary Examiner—B. Dobeck
Assistant Examiner—Saul M. Bergmann
Attorney, Agent, or Firm—Kolisch, Hartwell & Dickinson

[57] ABSTRACT

A method of run-length-limited encoding strings of data including a sequence of synchronizing bits having a value of binary zero for providing corresponding encoded bits which, when recorded on a magnetic storage medium, provide a maximum number of flux transitions. The steps of this method include serially receiving such a string of input bits, dividing the string of input bits into unique bit groups, replacing each group with a corresponding collection of encoded bits conforming with the limitations of the run-length-limited encoding scheme, including replacing each divided group of three input binary zeros into a collection of six encoded bits having two binary ones separated by two binary zeros, serially transmitting these collections of encoded bits for recording the same on the medium in the same sequence as the corresponding input bit groups are received.

1 Claim, 5 Drawing Figures

SYNCHRONIZATION-PROMOTING DATA CODING METHOD

BACKGROUND AND SUMMARY OF THE INVENTION

This invention pertains to a method of run-length-limited encoding. More particularly, it pertains to such a method for encoding a string of binary bits which includes a sequence of synchronizing bits to produce a sequence of encoded bits for each such sequence of synchronizing bits which, when recorded on a magnetic storage medium, have a maximum number of flux transitions.

This invention relates particularly to encoding data received from a computer onto a magnetic disk or other similar magnetic recording medium. Conventionally, data is recorded and recognized on the magnetic medium by the flux transitions which occur. That is, when a binary one bit is recorded on the medium it is represented by a flux transition. Correspondingly, a zero bit is represented by no flux transition.

A problem of recording data directly onto a magnetic medium is that, among other things, a long string of zeros is represented by a constant flux on the magnetic medium without any transitions. This means that there are no indications on the magnetic medium which may be used to identify when a data bit is represented on it.

Data is normally read by tracking over the magnetic medium while taking readings from a read head which is essentially told when to make the reading by a clock which times each reading. Properly timed, this clock tells it to read at the same time a bit location passes below the read head. However, if the read head is not properly synchronized with the traveling medium, then incorrect readings are produced.

In order to avoid this problem, several encoding methods have been used in the past. One such method, known as frequency modulation (FM), inserts a clock pulse or flux transition in between each data pulse. This means that twice as much space is required on the magnetic medium in order to record the same data. However, it provides a positive clocking pulse for each data pulse to synchronize the time for reading the data pulse.

A modified frequency modulation (MFM) or double-density encoding system has also been developed and is in wide use. In this system, data is recorded directly onto a recording medium except for the case when there are two zeros being recorded consecutively. In such a case, a clock pulse is inserted between them. If the data is considered to have a spacing of two, then in a string of zeros a clock pulse is inserted at every second location. It can be seen that this provides an increased data density as compared to the FM method.

Run-length-limited (RLL) encoding is a method which also was developed in order to improve on the MFM method. In this method, there is a minimum allowed spacing and a maximum allowed spacing between flux transitions. In the case at hand, a minimum of two and a maximum of seven consecutive zeros are required in order to properly be able to read the data. There is a minimum number of consecutive zeros required due to the closeness within which ones consecutively placed are readable. If flux transitions occur too closely together, they begin interfering with each other and do not produce reliable data. Thus, by separating the flux transitions by two gaps or zeros, the maximum density spacing of consecutive flux transitions is provided. This is equivalent to the spacing which would be required if unencoded data was directly fed onto and recorded on the magnetic medium.

For the reasons discussed previously, there also is a problem of coordinating the timing of the read activity. In the present case, a maximum of seven consecutive zeros equates to eight spacings between the widest spaced flux transitions. This is a standard which has been developed to maintain a very high reliability in data reading. In order to stay within these limitations, it is necessary to use a coding scheme which divides the incoming data into what will be called groups which are uniquely identifiable and which when concatenated into the original data string represent all possible combinations of incoming data. For each such unique group, there is developed a corresponding encoded group having a one-to-one correspondence with the unique incoming data groups. By using this coding scheme, it is possible to increase the density of data recording on the magnetic medium by approximately 50 percent over the MFM method.

Another problem which exists in the writing and reading of data onto a magnetic medium is in coordinating the control of the mechanical read or write device with the rate of either receipt of incoming bits during a writing operation or reading the bits existing on a magnetic medium for subsequent transmission. In the conventional case of MFM encoding methods, preceding a string of data and address identification bits, there is transmitted a string of zeros which are used for synchronization. As stated above in MFM encoding, a clock pulse is inserted between two consecutive zeros. Thus, when a string of zeros are transmitted, they are encoded into a series of pulses between each pair of zeros. When this is recorded on the magnetic medium, it provides a maximum number of flux transitions which thereby produce the quickest synchronization between the rate of data propagation and the write function. Correspondingly, it permits the quickest sync during a read operation between movement of the disk carrying the data and the read function.

The run-length-limited encoding scheme envisioned in this invention is useable for either MFM encoding or RLL encoding.

It therefore is a general object of this invention to provide RLL encoding which is compatible with MFM encoding.

More specifically, it is an object of this invention to provide an RLL encoding method which is able to encode all groups of incoming data bits into encoded collections of bits with a code which also produces a maximum number of flux transitions during the transmission of a large group of zeros for synchronization as used during MFM recording.

As discussed above, the method of this invention applies to RLL encoding having a minimum of two and a maximum of seven consecutive zeros. The method of this invention provides for serially receiving a string of input bits, serially dividing that string of input bits into groups of bits belonging to a set of unique bit groups containing, when concatenated, all possible combinations of bits and replacing each group with a corresponding collection of encoded bits.

The collections of encoded bits are organized to have, when concatenated, a minimum of two and a maximum of seven consecutive zero bits. Each divided group of three input zero bits is replaced by a collection of six encoded bits having two binary ones separated by two binary zeros. The collections of encoded bits are then serially transmitted for recording on a magnetic medium. It can be seen that this produces, for each sequence of synchronizing zero bits, a maximum number of flux transitions on the magnetic medium.

These and additional objects and advantages of the present invention will be more clearly understood from a consideration of the drawings and the detailed description of a preferred method of practicing the invention.

DETAILED DESCRIPTION OF THE INVENTION

Figure 1:
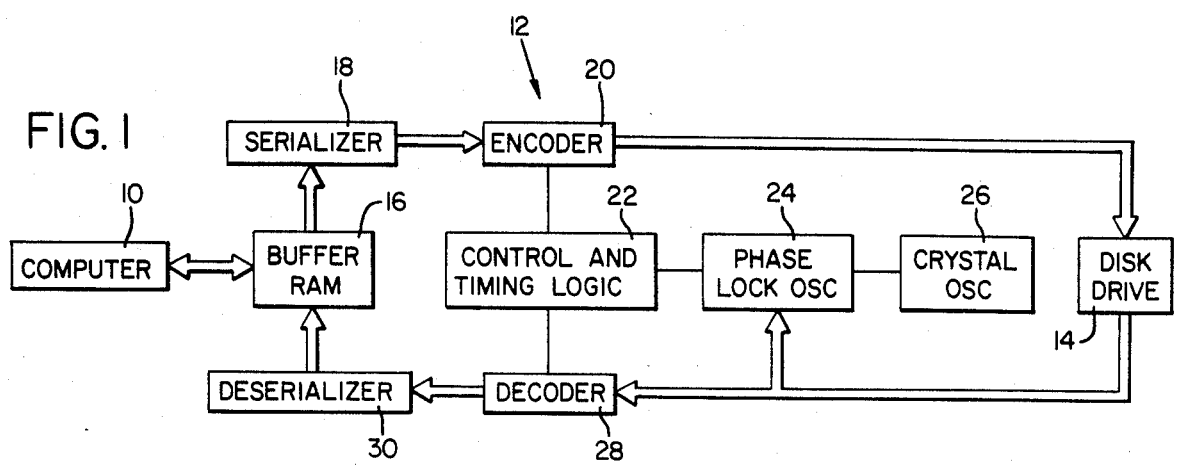
FIG. 1 is a general schematic showing the general environment in which the instant invention is practiceable.

Referring initially to FIG. 1 and describing encoding apparatus usable in practicing a preferred encoding method as contemplated by this invention, a computer 10 is connected through data processing equipment shown generally at 12 to a disk drive 14 on which it is intended to store and retrieve data. Equipment 12 includes a buffer RAM 16 connected to computer 10 through a communication channel. A communication channel also extends from buffer RAM 16 to a serializer 18 and thence to an encoder 20 which is connected to the disk drive. Encoder 20 is controlled by a control and timing logic circuit 22. Circuit 22 is connected to a phase lock oscillator circuit 24 which in part generates a pulse based on a crystal oscillator 26 to which it is connected.

Disk drive 14 is also connected for data transmission to a phase lock oscillator 24 and a decoder circuit 28. Decoder 28 is controlled, as was encoder 20, by control and timing logic circuit 22. Decoder 28 is further connected through a communication channel to a deserializer 30 which is further connected to buffer RAM 16 for connection to computer 10.

Encoder 20 is the primary circuit for practicing the method of the present invention. Its functional parts are broken out in block diagram form in FIG. 2 where the encoder is shown generally at 20. Encoder 20 includes a shift register 32 which is connected to serializer 18 discussed previously. Register 32 is driven by a clock 33 having a frequency of ½f (f being the frequency of data transmission received from computer 10). Clock 33 is more correctly a part of control circuit 22 since the clock pulses are generated ultimately from crystal oscillator 26 through phase lock oscillator 24 and control and timing logic circuit 22. Register 32 is further connected to an encoder logic circuit 34 to which is connected a counter 36. Besides the clocking pulses, circuit 34 is further controlled by control circuit 22 through a plurality of leads shown collectively as lead 35.

Encoder logic circuit 34 is connected to another shift register 38 which in turn is connected to disk drive 14.

This latter shift register is clocked from a clock 40 having the same source as clock 33, but with a frequency f. Clock 40 also drives counter 36.

Figure 4:
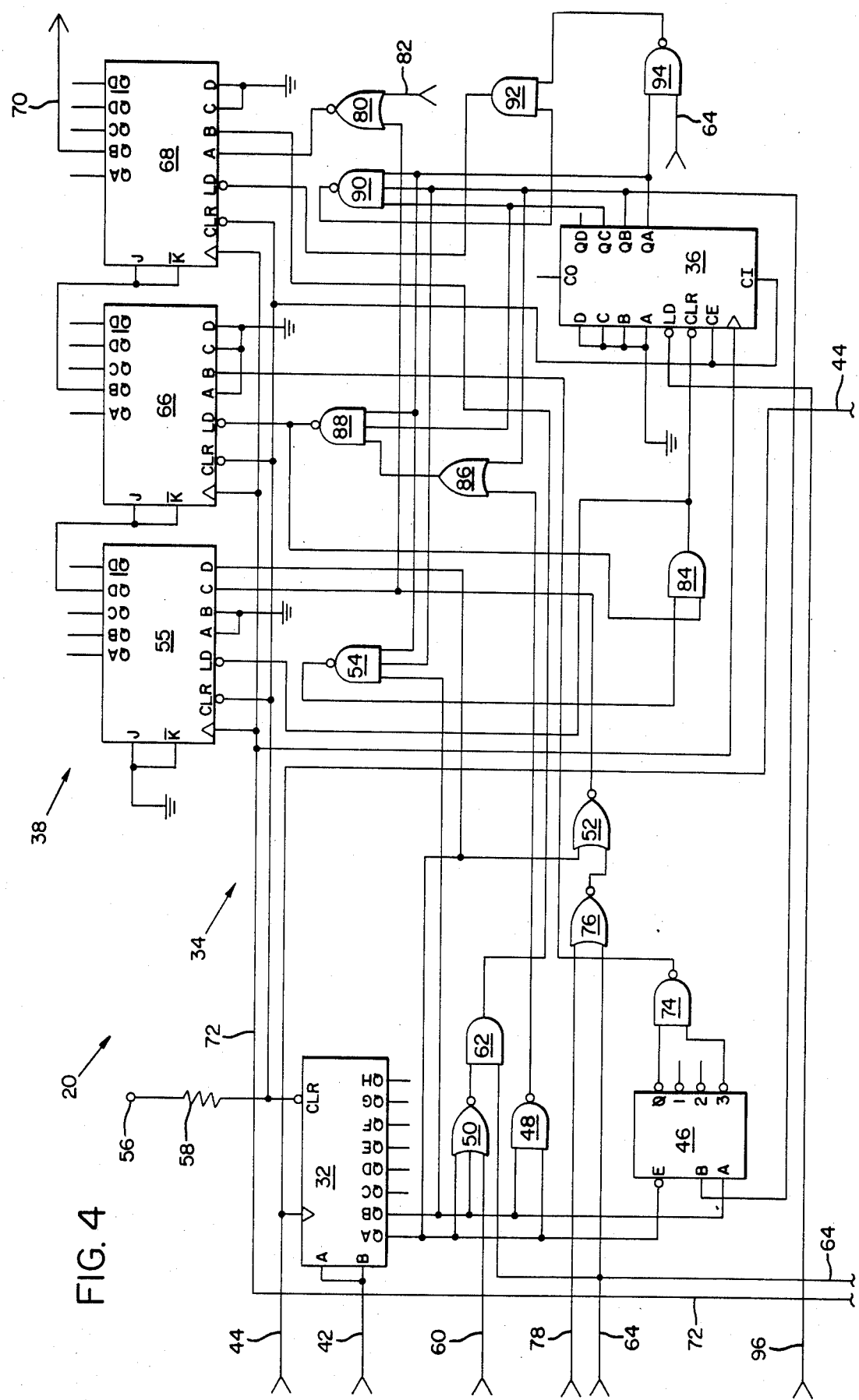
FIG. 4 is a circuit diagram showing the specific circuit components of the encoder of FIG. 2.

Referring now to FIG. 4 and explaining in detail encoder 20, shift register (LS 164) 32 is connected at its A and B terminals to serializer 18 through a lead 42. It is clocked from clock 33 over a lead 44. Output QA is connected to the A terminal of a logic integrated circuit (LS 139) 46, to a NAND gate (LS 00) 48, to a NOR gate (LS 27) 50, to another NOR gate (LS 02) 52, and finally to the D input terminal of a shift register (LS 195) 55 which forms a part of what was originally referred to generally as shift register 38.

The QB output terminal of register 32 is connected to the enable terminal of circuit 46, to NAND gate 48, to NOR gate 50, as well as to a NAND gate (LS 10) 54. The clear (CLR) terminal of register 32 is connected to a five-volt reference power supply at 56 through a 10 kilo-ohm resistor 58.

The third input terminal of NOR gate 50 is connected to a "DROP MFM CLOCK BIT" signal from control circuit 22 via a lead 60, as shown. The output of NOR gate 50 is connected to an input of a NAND gate (LS 08) 62. The other input to gate 62 is connected to a "−RLL" control lead 64 which also comes from control circuit 22.

Included within general shift register 38, besides individual shift register 55, are additional individual shift registers 66, 68 which are of the same type as register 55. The J and $\overline{K}$ inputs to register 55 are kept low by connecting them to ground. The QD output of register 55 is connected to the J, $\overline{K}$ input terminals of register 66. The QB output of register 66 is similarly connected to the J, $\overline{K}$ inputs of register 68. Finally, the QB output of register 68 is connected to disk drive 14 by a lead 70.

These three shift registers are clocked by what has been referred to as clock 40, contained within control circuit 22 via a lead 72. Further, the CLR terminals of the registers are all connected to positive reference 56 through register 58.

The B input terminal of circuit 46 is connected to the QB output terminal of counter 36. The 0 and 3 output terminals of circuit 46 are connected as the two inputs to a NAND gate (LS 00) 74, the output of which is connected to the B input terminal of register 66.

The output of AND gate 62 is connected to the B input terminal of register 68.

The second input to NOR gate 52 is from another NOR gate (LS 02) 76. The inputs to gate 76 are from −RLL lead 64 and a "−DROP RLL BIT" lead 78, which is another control lead from control circuit 22.

The output of NOR gate 52 is connected to the C input terminal of register 55 as well as to the input of a NOR gate (LS 02) 80, the output of which is connected to the A input terminal of register 68. The other input to gate 80 is a "+RLL" lead 82 from control circuit 22.

The output of NAND gate 54 is an input to an AND gate (LS 08) 84, the output of which is connected to the CLR terminal of counter 36 and the load (LD) terminal of register 55.

The output of NAND gate 48 is an input to an OR gate (LS 32) 86 which also receives as an input the output from the QB terminal of counter 36. The output of gate 86 is one of three inputs to a NAND gate (LS 10) 88. One of the other two inputs to gate 88 is the QC output from counter 36. The third input to gate 88 is the QA terminal output of counter 36.

The QA and QB terminals of counter 36 are also connected as inputs to gate 54. Further, output terminals QA, QB and QC of counter 36 are the three inputs to a NAND gate (LS 10) 90. The output of gate 90 forms the input to an AND gate (LS 08) 92. The other input to gate 92 is the output of a NAND gate (LS 00) 94. Gate 94 has as its inputs −RLL lead 64 as well as the QA output terminal from counter 36. The output of gate 92 is connected directly to the load (LD) terminal of register 68.

Completing a description of encoder 20, a timing signal lead 96 is connected between control circuit 22 and terminal LD of counter 36.

Figure 3:
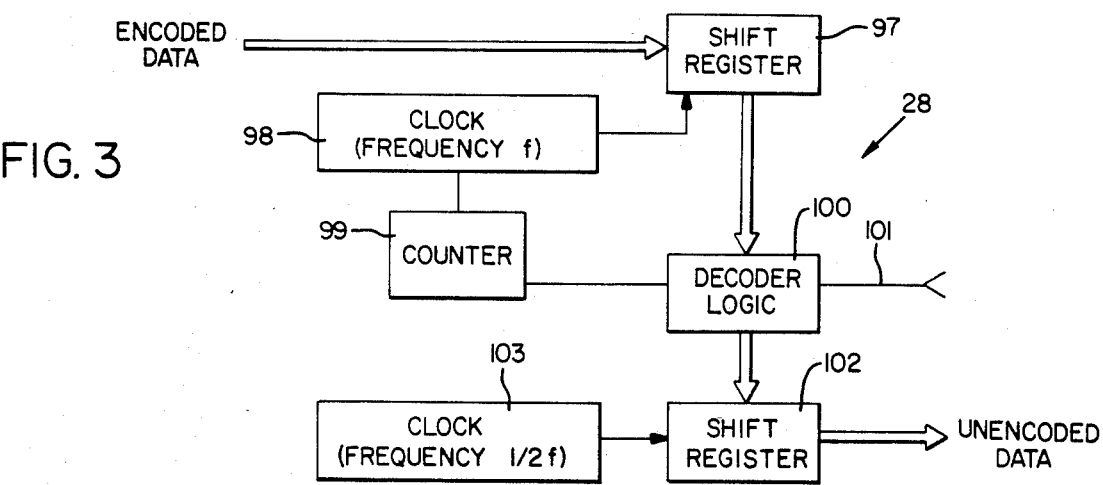
FIG. 3 is another schematic similar to the schematic of FIG. 2 showing the decoder of FIG. 1.

Describing now decoder 28 and referring to schematic FIG. 3, a shift register 97 receives encoded data from disc drive 14. Register 97 is clocked by a clock 98 having a frequency f. Clock 98 actually is included within control circuit 22 and is essentially the same clock as clock 40 described with reference to encoder 20. A counter 99 also driven by clock 98 is connected to a general decoder logic circuit 100 which receives data from register 97. Decoder circuit 100 is connected to control circuit 22 through a plurality of control leads which are shown as a package of leads indicated at 101 in the Figure. Decoder circuit 100 controls an output shift register 102 which is clocked by another clock 103. This clock has a frequency ½f and also technically is a part of control circuit 22. Shift register 102 is connected at its output to deserializer 30 discussed with reference to FIG. 1.

Figure 5:
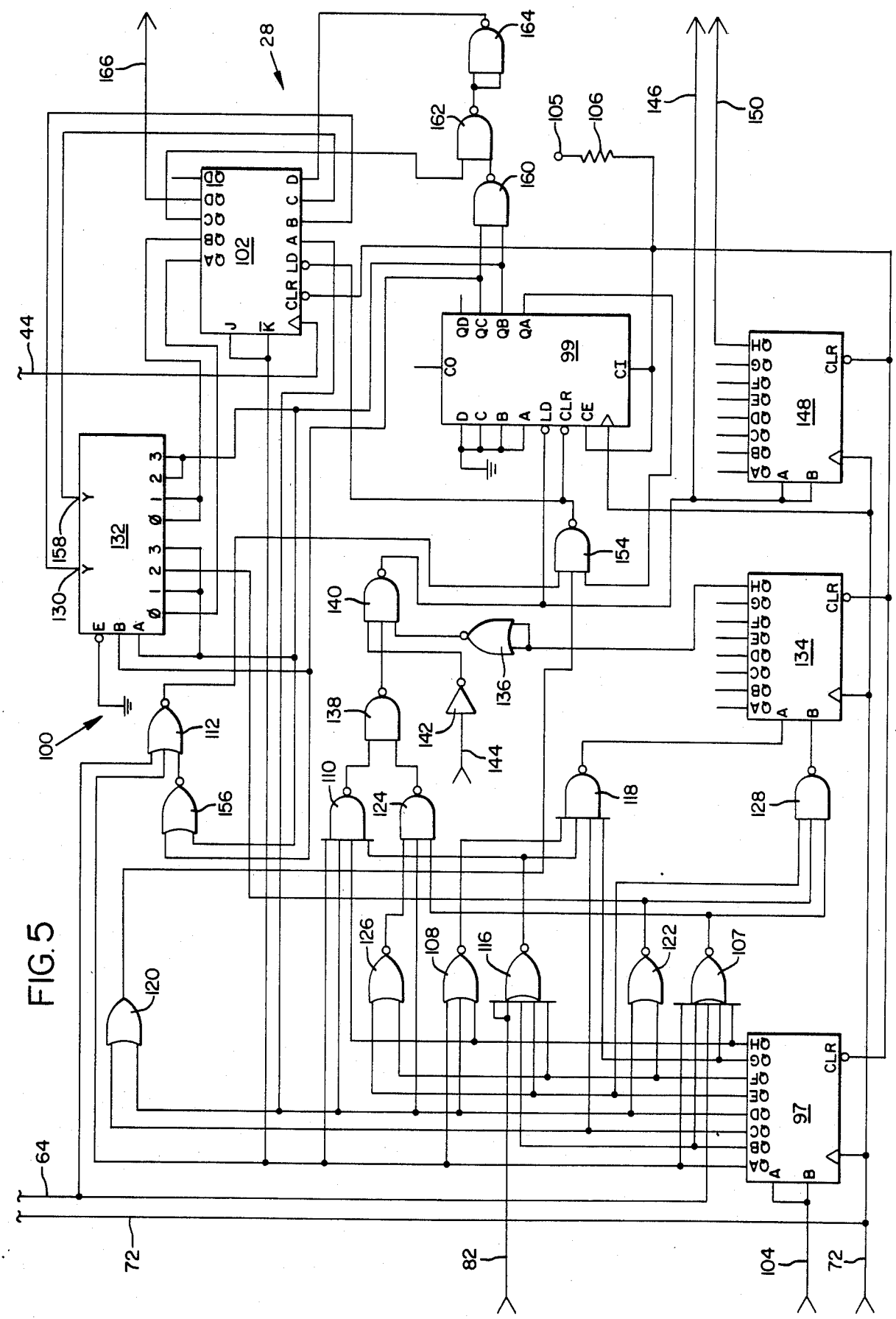
FIG. 5 is a circuit diagram showing the specific circuit components of the decoder of FIG. 3.

Describing now in detail decoder 28 as shown in FIG. 5, a "+NRZ READ CODE" lead 104 is connected to the A and B input terminals of shift register (LS 164) 97. Register 97 is clocked by clock lead 72 described with reference to encoder 20. The CLR terminal of register 97 is connected to a positive 5-volt reference at 105 through 10 kilo-ohm resistor 106.

The QA output terminal of register 97 is connected respectively to the inputs of a NOR gate (LS 60) 107, another NOR gate (LS 27) 108, a NAND gate (LS 20) 110, another NOR gate (LS 27) 112, as well as the JK̄ inputs of shift register (LS 195) 102.

The QB output from register 97 is also connected to gate 107. Additionally, along with lead 82, it is connected to the input of a NOR gate (LS 60) 116.

The QC output terminal of register 97 is connected to a NAND gate (LS 20) 118 and an OR gate (LS 32) 120.

Output QD is connected to a NOR gate (LS 02) 122, to gates 108, 110 and 120, to a NAND gate (LS 10) 124, as well as to the A input terminal of register 102.

The QE output terminal of register 97 is connected to gate 116, to a NOR gate (LS 02) 126, as well as to a NAND gate (LS 10) 128.

Output terminal QF of register 97 is connected to gate 122, gate 116, and gate 126.

Output QG of the same register is connected to gate 107 and gate 118.

Output QH is also connected to gate 107, as well as gate 108 and gate 110.

Lead 64 is the fifth and final input to gate 106. It is also an input to gate 112.

Gate 110 has as a final and fourth input the output of gate 116. This same output is an input to gate 118. The output of gate 108 is connected directly to an input of gate 118.

The output of gate 107 is connected to gates 124 and 128. The output of gate 122 is connected to gate 128 as well as to the 2 input pin of a first set of 0-3 inputs associated with a first output Y terminal 130 of a multiplexer integrated circuit (S 153) 132.

The output of gate 126 is connected directly to an input of gate 124. The outputs of gates 118, 128 are connected respectively to the A, B input terminals of a shift register (LS 164) 134. Register 134 is clocked from lead 72. Its CLR terminal is connected to reference 105 through resistor 106, as was the case for register 97. Only the QH output terminal of register 134 is connected, and it is connected to both inputs of a NOR gate (LS 02) 136.

The output of gates 110, 124 are each connected to inputs of another NAND gate (LS 00) 138. The outputs of gates 136, 138 from two of the three inputs to a NAND gate (LS 10) 140. The third input to gate 140 is received from an inverter (LS 04) 142 which has connected as its input a "−FIND ADDRESS MARK" lead 144 connected to control circuit 22.

The output of gate 140 is connected back to control circuit 22 through an "−ADDRESS MARK FOUND" lead 146. It is further connected to the A,B inputs of a shift register (LS 164) 148. The sole output of register 148 is the QH terminal which is connected also to the control circuit through an "−ADDRESS MARK SYNCHRONIZATION" lead 150. As with registers 97 and 134, register 148 is clocked by connection to lead 72 and is connected at its CLR terminal to reference voltage 105 through resistor 106.

Further, the output of gate 140 is connected to the LD terminal of counter (LS 163) 99. The A, B, C and D terminals of counter 99 are connected to ground.

The output of gate 120 is connected directly to the input of a NAND gate (LS 10) 154. This gate also receives as an input the output of gate 112. The third input to gate 154 is the output on terminal QA of counter 99.

The counter is clocked from lead 72. The CE and CI terminals of the counter are held high by connecting it to reference voltage 105 through resistor 106. The QB and QC outputs of counter 99 form two inputs to a NOR gate (LS 02) 156, the output of which forms an input to gate 112. Output QB is also connected to the A input terminal and the 1 and 3 terminals of the previously mentioned first set of terminals associated with output terminal 130, and also to input terminals 2 and 3, associated with a second Y output terminal 158 of register 132.

The QC output terminal of counter 99 is also connected to the B input of register 132. The enable (E) terminal of that register is grounded.

The 0 input terminal associated with output terminal 130 is connected to output terminal QA of register 102. Output terminal QB of this latter register is connected to input terminals 0 and 1 associated with the second output terminal 158.

The CLR terminal of register 102 is connected to reference voltage at 105 through resistor 106.

The counter outputs QB and QC form the two inputs to a NAND gate (LS 00) 160. The output of gate 160 is connected to an input of a NAND gate (LS 00) 162. The other input to gate 162 is connected to output terminal QC of register 102. The output of gate 162 is connected to both inputs of another NAND gate (LS 00) 164. The output of this gate is connected to the D input to register 102.

Completing a description of decoder 28, register 102 is clocked by what is referred to as the disk data clock by connection with lead 44, previously described with reference to FIG. 4. The output from decoder 28 is taken from the QD output from register 102 which is connected to deserializer 30 through a "+NRZ READ DATA" lead 166.

Operation

Describing initially the general operation of the present invention, reference is made to FIG. 1. It is well understood that computer capabilities can be substantially enhanced by recording data and programs which are not actively being used or operated on by storing them on a remote storage medium rather than within the active computer system. In order to accomplish this, it is necessary to write data from a computer onto a storage medium and then read it from the medium back into the computer. The present invention applies to the process of maximizing the amount of information which may be stored on a medium.

Data from computer 10 is transferred to buffer RAM 16 during a write procedure. Buffer 16 holds the data until it may be written on disk drive 14. The data comes from computer 10 over a set of parallel transmission lines which are converted into a series progression of data by serializer 18. The data is serially fed into encoder 20 where it is converted from raw data, or actual data usable by a computer, into encoded data which satisfies the recording limitations which were described previously. Encoder 20 is controlled by control and timing logic circuit 22 so that each data bit received by the encoder is properly read and encoded for transmission onto disk drive 14. During this phase, pulses generated by phase lock oscillation 24 which are originally generated by crystal oscillator 26 are used to control the inputting and outputting of data by encoder 20.

Correspondingly, when encoded data is read from disk drive 14, the read data bits are transmitted to decoder 28 as well as into phase lock oscillator 24. Oscillator 24 is able to synchronize with the incoming data bits so that decoder 28 will be controlled to accurately feed in, decode and feed out data. Decoder 28 reconstructs the raw data which was originally input to encoder 20. It is serially fed into deserializer 30 which reconverts the serial data into parallel data for transmission over parallel lines to buffer RAM 16. Buffer RAM 16 then feeds the data into computer 10.

In the system in which the method of applicant's invention is preferably practiced, the data received by the computer, which will be referred to as raw data, is encoded into what is referred to as 2,7 RLL encoding. In this run-length-limited coding scheme, there are a minimum of two and a maximum of seven consecutive zeros for the reasons described previously. The following table shows the encoding scheme. The list in the left column shows groups of raw data as received from or sent to the computer. The right column lists the RLL code corresponding to the list on the left.

| DATA | RLL CODE |
| --- | --- |
| 11 | 1000 |
| 10 | 0100 |
| 000 | 100100 |
| 001 | 001000 |
| 010 | 000100 |
| 0110 | 00100100 |
| 0111 | 00001000 |

The sets of data shown in the left column are referred to herein as groups of bits, while the corresponding entries in the right column are referred to collections of bits. Any sequence of incoming raw data bits may be broken into a combination or a concatenation of the seven groups of data bits shown in the table. There is then a conversion of each group of data bits into the corresponding collection of RLL coded bits next to it in the table. Conversely, every sequence of encoded bits may be broken into the collections of bits shown. These collections may then be reconverted back into raw data. The result is that the computer only sees the raw data while the disk drive only sees the RLL coded bits.

It should be noted that various forms of this RLL code can be created. However, an important feature of this invention is the method of converting a sequence of zeros into a sequence of zeros and ones which provide a maximum number of flux transitions when recorded on a disk drive. The recording track of a disk drive is broken into many regions of data called sectors. The beginning of each sector is defined by a prewritten identification field which contains the physical sector address plus additional identifying information. The identification field is then followed by a user data field. The beginnings of both the identification field and the data field are flagged by unique characters called address marks. The run-length-limited encoding scheme contemplated by this invention uses an address mark which is a 4B hexadecimal data byte with one of the bits dropped. This results in a unique pattern with eight zeros in a row. This is the only exception to the rule that there is a maximum number of seven zeros in a row.

Each sector also has prior to the identification address mark a synchronization region which is used to synchronize the transmission of data with the reading or writing of the data on the disk drive. During synchronization, as described previously for a modified frequency modulation encoding scheme, a series of zeros are transmitted. These get converted into a series of clock pulses which produce flux transitions used for synchronizing.

In order to have a system which is usable for both MFM-intended encoding schemes as well as RLL encoding schemes, it is necessary to have an RLL code which converts the series of zeros used in MFM coding into a set of coded bits which could be also used for synchronization during run-length-limited encoding.

By the method of this invention, a series of three zeros are encoded into a code of two ones separated by two zeros. This provides that there be the maximum number of ones transmitted, since a minimum of two zeros between ones are allowed. A group of three zeros is thus converted into a collection of six-bits which includes the two ones separated as described.

It will be noted in the code table that the last two bits of each RLL collection are always zeros. This coding scheme could also have been accomplished by transferring one or both of those zeros to the left end of the code from the right and still have satisfied the coding requirements.

In order to simplify the logic involved in identifying groups of raw data, it was found that by keeping count of the number of bits which are fed into the circuit and reading only the last two bits read in, the proper groups could be identified. Thus, it is not necessary to read and compare all the bits which have been read in. As an example, if the two bits read in are either a "11" or a "10", the counter will read "1" (since the first entry is read as "0" in a binary system). So, with the counter at "1" and the bits being as described, the data has to be in one of first the two groups in the table. If those same two data bits are read, but the counter has a count of "3", then it will indicate that one of the last two data sequences has been read in and forms one of the two four-bit groups shown. Once this is recognized, it can then be encoded.

Also, if a group is not identified when two bits have been entered then the first bit that was read in must have been a zero. Thus, if the count is "2", then it is only necessary to look at the second and third bits read in to determine whether or not it fits within one of the middle three groups of bits. If it does, then the corresponding encoded group can be determined. If it does not, then an additional bit is read in. In this case, it is known that the first digit again has to be a zero and, further, the second bit has to be a one. So regardless of which of the latter two groups are identified, they can be uniquely identified from the last two bits.

ENCODER

Figure 2:
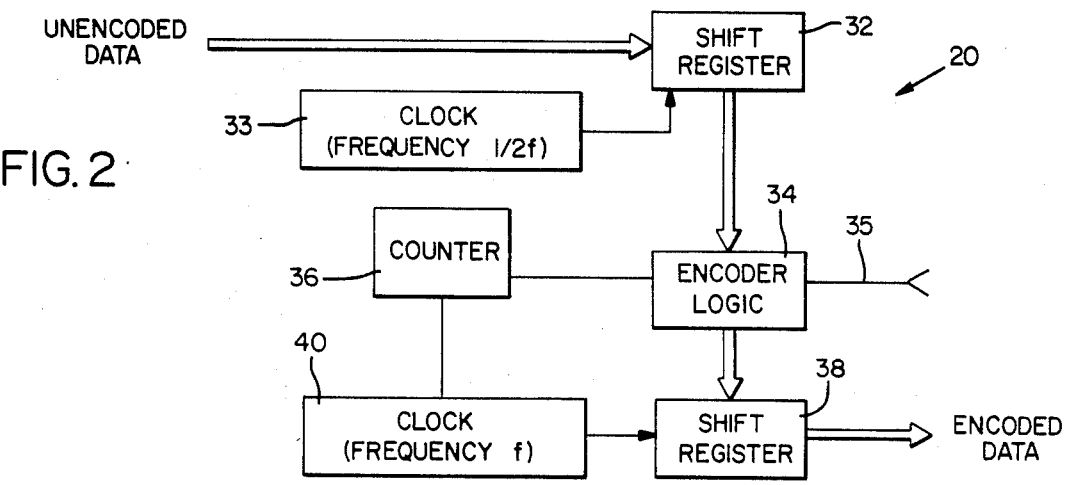
FIG. 2 is also a general schematic but showing increased detail in the encoder portion of the schematic shown in FIG. 1.

Directing attention now to FIG. 2, raw data is fed into register 32 serially from serializer 18. It is clocked in by clock 33 having a frequency of one-half f. This is the frequency at which data is transmitted from the computer. As each bit is shifted into shift register 32, counter 36 is incremented by two since it is clocked at twice the rate as the register. Encoder logic circuit 34 then analyzes the group of bits stored in shift register 32, according to the logic just described relative to the counter and value of the last two bits entered in order to identify which data group has been shifted in. Once the data group has been identified, the corresponding run-length-limited code is generated at shift register 38 and clocked out by clock 40 at a frequency f. It can be seen that each run-length-limited code has twice the number of bits as the corresponding raw data group which it corresponds to. Thus, by shifting the encoded bits out at a rate which is twice that of the incoming raw data bits, the coded collections are transmitted at the same rate as the raw data groups are received.

Referring now to FIG. 4 and describing in more detail the operation of encoder 20, and in particular encoder logic circuit 34, several initial comments will help understand operation of the circuit. First, the circuit shown is more complex than is actually required for use simply for run-length-limited encoding. The circuit is usable in either an MFM or an RLL encoding scheme. There are thus several control circuit leads which are used to control the encoding logic depending on which method is used. For the purposes of this invention, it is only necessary to describe operation of the circuit using RLL encoding. The logic state of several of the control lines may therefore be initially established and considered to be held constant for purposes of this discussion. A person skilled in the art could easily follow the logic of the circuit operation through using MFM once the general logic for RLL encoding is described.

Several of the circuit components are also used to create or identify the address mark previously described. Since this is not part of the basic encoding scheme as contemplated by this invention, it will not be described in detail. Rather, it will be left to the skilled reader to follow the basic logic involved in this circuit to determine its operation based on the logic state of the leads which relate to it. This will help simplify the discussion of the circuit for use as an encoder as contemplated by the present invention.

During normal RLL encoding, lead 64 is low and leads 60, 78 and 82 are high. Raw data, which is non-return-to-zero write data in this case, is transmitted over lead 42 into shift register 32. It can be seen that only two outputs are taken from shift register 32. These are the last two data bits which were received. With the receipt of each bit by register 32, counter 36 registers two counts. Thus, when two bits have been received in register 32 the output terminals QA-QD will be 1, 1, 0, 0, respectively, or binary 3, since QA is the least significant bit.

Shift registers 55, 66 and 68 are used to store four bits, two bits and two bits, respectively, of the RLL encoded bits when eight bits of output are required. Register 55 will always be used for the first four bits of the code. In this case, the first four bits are the rightmost four bits in the code shown in the table with the right-most column being the least significant bit. Input lead A of register 55 is used for the least significant bit of the code. If a four-bit code is produced, then input D of register 55 is the most significant bit. If a six-bit code is produced, then input B of register 66 is the most significant bit. Finally, if an eight-bit code is produced, then input B of register 68 is the most significant bit.

It will be observed in reviewing the RLL codes that the two rightmost or least significant bits are always zero. Thus, terminals A and B of register 55 are always zero and therefore are shown grounded. The fifth column from the right in the table has all zeros as well. Thus, terminal A of register 66 is also grounded. Finally, the leftmost two columns used for an eight-bit code are both always zero as well. Thus, for RLL encoding terminals A and B of register 68 are also always low. However, since they are not always low for MFM encoding, their state must be controlled. Terminal A of register 68 will always be low for RLL encoding since lead 82 is always high the output of NOR gate 80 will always be low. The input to terminal B will also always be low since it comes directly from AND gate 62 which has as one input lead 64 which is kept low for RLL encoding.

Lead 96 is used to carry a timing signal from control and timing logic circuit 22 to shift counter 36 in synchronization with the beginning of the data. It is initially set low to clear the counter by loading all zeros. This is done at the beginning of the synchronization field.

During synchronization, the first two incoming bits are both zeros. When these two bits have been entered, the counter will read binary 3 as described previously. Further, outputs QA and QB of register 32 are both low.

Thus, the enable terminal of circuit 46 is low. When it is low, the A and B input values determine the output. Otherwise, the outputs are all high. Input A is low from terminal QB of register 32. Input B of circuit 46 is high, since it comes from output QB of counter 36. In this instance, output "2" is low. This leaves outputs "0" and "3" both high, which makes the output of gate 74 low. This output is connected to input terminal B of register 66 which is thus made low.

The input to gate 54 from output QB of register 32 is low. This means the output from gate 54 is high as an input to gate 84.

The output of gate 48 having as inputs the two outputs of register 32, is high. Thus, the output of OR gate 86 is also high. This forms one input to gate 88. Another input to gate 88 is the QC output from counter 36 which at this point is low. Thus, the output from gate 88 is high, making both inputs to gate 84 high, causing its output to be high. The output from gate 84 goes to the load terminal of register 55. The output of gate 88 goes to the load terminal of register 66.

The output of gate 94 is high since lead 64 as an input is low. This forms one input to gate 92.

One of the inputs to gate 90 from counter 36 is low so the output from gate 90 is high. Thus, the output of gate 92, and, therefore, the load terminal of register 68, is high. At this point, therefore, it can be seen that the values received by the input terminals to the shift registers are not loaded into the output terminals since they are all high.

As the next data bit is entered, which again is a zero since this is the synchronization field, the counter increments its count by one. This means that it has an output from QA to QD of 1, 0, 1, 0, respectively. This represents a binary 5 since six counts have occurred for the three bits. The outputs from input shift register 32 are still both low since all zero bits have been entered. The enable terminal of circuit 46 is low, resulting in its outputs being determined by its inputs A, B. Both of these inputs are low. Thus, output "0" is low and output "3" is high. This means the output from gate 74 is high. This value is carried to input terminal B of register 66.

The output of gate 76 is always low, since lead 78 which forms an input to it is always high for RLL encoding. Thus, the output of gate 52 depends on the value of output QA of register 32. In this case it is low, so the output from gate 52 is high. This means that the value of input terminal C of register 55 is also high.

The input terminal D of register 55 is connected directly to output QA of register 32 which is low.

We now have formed on the inputs to registers 55 and 66 the inputs for the code corresponding to a raw data of "000" which is "100100". This latter code appears on input leads B, A of register 66 and D, C, B, and A of register 55, in that order. In order to be able to load this code into the output, it is necessary to have a low value on the load or "LD" terminal of the respective shift registers.

Gate 90 has as its input the three connected outputs from counter 36. Since output QB is low, the output of gate 90 is high. This means that the output of gate 92 is also high, which prevents shift register 68 from loading its input values into the output. Since this is a six-bit code rather than eight-bit code, its input values should not be transferred to the output values. It is thereby disabled from doing so.

One of the inputs to gate 86 is low from the output of terminal QB of counter 36. With both inputs to gate 48 being low, its output is high, so the corresponding input to gate 86 is high and its output is high. The other two inputs to gate 88 are both high from counter 36. This means the output of gate 88 is low, causing the values at the input terminals of register 66 to be loaded.

Further, the low input from gate 88 to gate 84 causes its output to go low. This also causes the values in register 55 to be loaded.

The low output of gate 84 is directly connected to the "clear" terminal of counter 36 causing it to be reset.

As each new data bit is serially received by register 32, the values of the outputs in registers 55, 66 and 68 are serially fed out on lead 70. With each clock pulse received on lead 72, which is the fast clock rate, a bit is transferred out and each of the bits is shifted toward the output by one position. Thus, by the time that two new bits are entered into register 32, the two values that had previously been in register 68 have been shifted out.

The two values that were in shift register 66 have been shifted into register 68 and then shifted out. Finally, the four bits which were in register 55 have been shifted serially into registers 66 and 68. This leaves register 55 to receive a new four-bit code for output if a two-bit data group is identified. If a third bit is required, as is the case during synchronization when three data zeros are converted into a six-bit code, then of the original four bits which were located in register 55, two have been outputted and two remain in register 68. This leaves registers 55 and 66 ready for reloading the new six bits.

This process continues for the entire synchronization field. The output on lead 70 is a continuous string of coded bits having "1"-bits separated by two "0"-bits for the duration of the synchronization field.

The logic which has been described for inputting the synchronization bits can be applied to any sequence of input raw data bits for identification of the data groups as listed in the table and conversion into the collections of coded bits corresponding to the data groups, as defined in the table.

DECODER

Referring now to FIG. 3 and describing the operation of decoder 28, encoded data is read from disk drive 14 into a shift register 97. The data is clocked in by a clock 98. The clock also drives a counter 99 which keeps track of the number of data bits which are read into register 97. A decoder logic circuit 100 evaluates the coded data under the control and timing logic circuit 22 in association with counter 99 to determine the corresponding raw data group which corresponds with the encoded data. When a proper conversion is located, the raw data is established in an output shift register 102 which transfers the unencoded data to deserializer 130 at a rate determined by a clock 103 which operates at a frequency one-half that of clock 98.

In actuality, clock 98 in FIG. 3 is the same as clock 40 shown in FIG. 2 and clock 103 in the figure is the same as clock 33. Both of these clocks are derived from control and timing logic 22 as was described with reference to FIG. 2.

Referring particularly to FIG. 5 and describing in detail the operation of decoder 28, it will be assumed that six bits have been read into register 97 since the last set of coded bits were converted into data bits and transmitted. At this time, counter 99 has been incremented six times so that its output is a binary 5. Thus, QA through QD have the values 1, 0, 1, 0, respectively.

By this time also the last output sequence of data bits have been output on lead 166. The output terminals of register 102 have taken alternate values of the input pulses which have been received on lead 104 through output terminal QA of input register 97. Thus, QA through QD of register 102 have values received over terminals J and $\overline{K}$ of 0, 1, 0, 0, respectively. The alternate values are received in register 102 because it is clocked at a rate one-half that of register 97. It should be noted that these values do not ever appear at the output, since by the time they have been shifted into position for output a new set of values are loaded from input terminals A through D.

Most of the logic gates shown in FIG. 5, at least on the lower left portion of the figure, are for control purposes in identifying an address mark either for MFM decoding or RLL decoding, as the case may be. For RLL decoding, lead 82 is held high so that the output from gate 116 is always low. This provides a continuously high output from gate 118, and thereby, on input terminal A of register 134.

Gate 128 will go low when the first half of the RLL address mark is identified. The full mark is 16 bits long. By the time a second half of the address mark is input into register 97, there is a low pulse on output terminal QH of register 134 which becomes a high output from gate 136 to gate 140.

The logic leading up to and including gate 138 determines whether or not the second half of the address mark is identified. If it is, then all three leads in the gate 140 are high and there is a low output from that gate. This causes the counter 99 to reload all zeros as well as input a low into register 148. Leads 146, 150 are therefore used to produce control signals to control circuit 22 for identifying the beginning of actual data transmission and the location of bits that are received. Since the address mark identification is not a part of the present invention, it will not be discussed in any further detail. However, by following the logic of the circuit shown, the control associated with address mark identification will readily be understood.

Assume that the code 100100 has been entered into register 97, as was described previously for a synchronization code sequence. The inputs to gate 120 are a high and a low value, respectively, from outputs QC and QD of register 97. This produces a high output from gate 120 which is then input into gate 154.

Gate 156 receives also a high and low input from outputs QB and QC from counter 99. This produces a low output from gate 156 which goes into gate 112. The second input to gate 112 comes from output QA of register 97 which is low. Finally, the third input to gate 112 is also low, since it is connected to lead 64 which is low for RLL encoding. With all three inputs low to gate 112, a high output is produced which in turn serves as another input to gate 154. Finally, the third input to gate 154 is the output QA from counter 99 which has a high value. With three high inputs to gate 154, it produces a low output. This low output extends to the "clear" terminal of counter 99 to reset it to zero. Further, it extends to the "load" terminal of register 102 which causes the values of A through D input terminals to appear on the corresponding output terminals.

However, prior to the clearing of counter 99 and the loading of register 102, it is necessary to determine what values are loaded in register 102. The values of input terminals B, A of register 132 have a value of 1, 0, respectively, since they are taken from the outputs of counter 99. This means that the values of the first and second locations "2" are to appear on the corresponding output terminals 130 and 158 of register 132. The first or left input terminal 2 of register 132 is connected to the output of gate 122. Since that gate's inputs are a low and a high from outputs QD and QF of register 97, it produces an output which is low. Thus, terminal 130 has a low value on it.

Correspondingly, the right or second set of input terminals to register 132 has a low value which comes from output terminal QB of counter 99. Thus, a low value also appears on terminal 158. These two values then are transferred to input terminals B and C of register 102, as shown. Input terminal A of that register has a low value from output terminal QD of register 97.

As was explained previously, output QC of register 102 is low. This is an input to gate 162 which also receives a high input from gate 160 from the high and low inputs received from counter 99. A low output from gate 162 is inverted in gate 164 to produce a low input to terminal D of register 102.

Thus, four "zeros" are loaded to the output of register 102 for serial transmission on lead 166. As the next six encoded bits are read in on lead 104 into register 97, the values of QB, QC and QD are output from register 102 on lead 166. This produces a continuous sequence of zeros corresponding to the original sequence of zeros originally received on the encoder 20.

The other RLL codes are also decoded by decoder 28. The logic associated with the decoding process is similar to that described for the synchronization code. By continued operation of decoder 28, all of the encoded bits stored on disk drive 14 may be decoded to form the original data which was received from the computer.

It can be seen that, following the method of encoding using run-length-limited encoding with a minimum of two and a maximum of seven zeros in consecutive combination, the standard string of zeros used for MFM synchronization may be converted into an RLL coded string of bits which provide for a maximum number of flux transitions. While a preferred method of practicing the invention has been described herein, it will be understood by those skilled in the art that various changes may be made therein without departing from the spirit and scope of the invention, as defined in the following claims.

It is claimed and desired to secure by Letters Patent:

1. A method for run-length-limited encoding a string of input binary bits, which string includes a sequence of at least three synchronizing bits all having a value of binary zero for use in determining the frequency of occurrence of the string of input bits, for recording encoded bits on a magnetic storage medium in a selected region having a synchronization field for storing encoded synchronizing bits, a binary one being represented on the medium as a magnetic flux transition and a binary zero as a lack of flux transition, said method comprising the steps of serially receiving such a string of input bits, serially dividing the string of input bits into groups of bits belonging to a set of unique bit groups containing, when concatenated, all possible combinations of bits, the set including a group of three consecutive binary zero bits, replacing each group with a corresponding collection of encoded bits, a unique collection of encoded bits existing for each unique bit group, the collections of encoded bits having, when concatenated, a minimum of two and a maximum of seven consecutive bits with a value of binary zero, said step of replacing including replacing each divided group of three input binary zeros into a collection of six encoded bits having two binary ones separated by two binary zeros, serially transmitting the collections of encoded bits for recording the same on the medium in the same sequence as the corresponding input bit groups are received, and by said foregoing steps, producing a sequence of encoded bits for each such sequence of synchronizing bits which, when recorded on a magnetic storage medium, have a maximum number of flux transitions.

* * * * *